(12) United States Patent
Lee (10) Patent No.: US 11,299,199 B2
(45) Date of Patent: Apr. 12, 2022

(54) APPARATUS AND METHOD FOR EPS CONTROL TO COPE WITH POWER SOURCE PROBLEM OF VEHICLE

(71) Applicant: MANDO CORPORATION, Gyeonggi-do (KR)

(72) Inventor: KwangHyung Lee, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 78 days.

(21) Appl. No.: 16/058,771

(22) Filed: Aug. 8, 2018

(65) Prior Publication Data

US 2019/0061810 A1    Feb. 28, 2019

(30) Foreign Application Priority Data

Aug. 22, 2017 (KR) .................. 10-2017-0105872

(51) Int. Cl.
*B62D 5/04* (2006.01)
*B62D 6/10* (2006.01)

(52) U.S. Cl.
CPC ............ *B62D 6/10* (2013.01); *B62D 5/0463* (2013.01); *B62D 5/0481* (2013.01); *B62D 5/0484* (2013.01)

(58) Field of Classification Search
CPC .. B62D 5/0481; B62D 5/0463; B62D 5/0484; B62D 6/10
See application file for complete search history.

(56) References Cited

U.S. PATENT DOCUMENTS

| 5,602,735 A * | 2/1997 | Wada ................ B62D 5/0436 180/446 |
| 2003/0045983 A1* | 3/2003 | Kondo ................ B62D 1/28 701/41 |
| 2010/0044146 A1* | 2/2010 | Kasai ................ B62D 5/0481 180/446 |
| 2011/0066331 A1* | 3/2011 | Yamashita ........... B62D 5/0463 701/42 |

(Continued)

FOREIGN PATENT DOCUMENTS

| CN | 101939207 | 1/2011 |
| CN | 101990510 | 3/2011 |

(Continued)

OTHER PUBLICATIONS

Office Action dated May 31, 2021 for Korean Patent Application No. 10-2017-0105872 and its English translation from Global Dossier.

(Continued)

*Primary Examiner* — Hunter B Lonsberry
*Assistant Examiner* — Matthew J. Reda
(74) *Attorney, Agent, or Firm* — Ladas & Parry, LLP (57) ABSTRACT

The present disclosure relates to an apparatus and a method for EPS control, which determine the amount of assist torque and estimate the amount of available assist in order to prevent a problem in relation to vehicle driving and driver's safety when there is malfunction in power supply. Accordingly, the present disclosure provides an effect in which the driver can take various measures according to his or her determination, instead of promptly moving the vehicle to a safety zone.

8 Claims, 4 Drawing Sheets

(56) References Cited

U.S. PATENT DOCUMENTS

2015/0367881 A1\* 12/2015 Tsunoda ............... B62D 5/0487
                                                              701/43
2018/0065657 A1\*  3/2018 Hirate .................. B62D 5/0481

FOREIGN PATENT DOCUMENTS

| CN | 102026862   | 4/2011  |
|----|-------------|---------|
| JP | 63-43865    | 2/1988  |
| JP | 6-15333     | 3/1994  |
| JP | 2000-329628 | 11/2000 |
| JP | 2003-312510 | 11/2003 |
| JP | 2005-343323 | 12/2005 |
| JP | 2011-126535 | 6/2011  |

OTHER PUBLICATIONS

Office Action dated Dec. 9, 2021 for Korean Patent Application No. 10-2017-0105872 and its English translation from Global Dossier.
Office Action dated Nov. 29, 2021 for Chinese Patent Application No. 201810947096.0 and its English translation by Google Translate.

\* cited by examiner

APPARATUS AND METHOD FOR EPS CONTROL TO COPE WITH POWER SOURCE PROBLEM OF VEHICLE

CROSS REFERENCE TO RELATED APPLICATION

This application claims priority from Korean Patent Application No. 10-2017-0105872, filed on Aug. 22, 2017, which is hereby incorporated by reference for all purposes as if fully set forth herein.

BACKGROUND OF THE INVENTION

1. Field of the Invention

The present disclosure relates to an apparatus and a method for EPS control and, more specifically, to an apparatus and a method for EPS control, which determine the amount of assist torque and estimate the amount of available assist in order to avoid problems that might occur in connection with vehicle driving and driver safety when there is malfunction in a power supply.

2. Description of the Prior Art

Recently, vehicles have been provided with more electronic functions, and accordingly, various electronic devices have been installed in vehicles for usage.

The electronic devices installed in vehicles may include an electronic device for controlling an engine, an electronic device for controlling a power transmission device, an electronic device for controlling a brake device, an electronic device for controlling a suspension device, an electronic device for controlling a steering device, an electronic device for controlling instrumentation, an electronic device for information communication control, power source/wire harness electronic devices, and the like.

In order to control the above electronic devices, vehicles are generally equipped with an Electronic Control Unit (hereinafter, referred to as "ECU") that receives electric signals generated by various input sensors and outputs digital control signals for driving various actuators in an output part.

An Electric Power Steering (hereinafter, referred to as "EPS") system adds or removes the operating force for a steering wheel depending on the speed of a vehicle using the ECU so as to assist the driver with operation of the steering wheel by adjusting the amount of assist torque according to the driving of a motor. Based on information of a rotational angle sensor (steering angle sensor) installed on the steering wheel or steering shaft and the speed and information such as the speed of a vehicle and the like, the ECU calculates the optimum force and provides the motor with instruction.

The EPS system facilitates steering, and has less power loss than hydraulic steering system, thereby avoiding lowering of mileage. However, unlike vehicles (especially, diesel engine vehicles) using hydraulic power as a steering power source in which power-related malfunction, such as failure of an alternator, has little effect on the steering of the vehicle, the vehicle having the EPS using current as a power source may cause problems in vehicle driving and driver safety when power-related malfuction occurs.

Currently, a method to cope with the occurrence of problems of a power source, such as a battery or an alternator, is merely to turn on the warning lamp, thereby allowing the driver to recognize the problem. Therefore, since the driver (or a vehicle control unit) (hereinafter, the driver encompasses the vehicle control unit) does not know how long the steering of the vehicle is possible, when failures occur in the vehicle, the driver must promptly move the vehicle to a safety zone, and must wait for a repair service even if the vehicle is still operable.

SUMMARY OF THE INVENTION

In order to solve the above problem, the present disclosure provides an apparatus and a method for EPS control, which support, when malfunction occurs in a power source, a driver to recognize the malfunction and to anticipate a time for which the steering is possible, thereby taking relevant actions in response thereto.

In order to solve the above-mentioned problem, an embodiment provides an apparatus for Electric Power Steering (EPS) control, which may include: a power source problem determiner configured to determine whether or not a power source problem has occurred using a voltage of a power input to a motor; a controller configured to, if it is determined that a power source problem has occurred, determine the amount of assist torque using the voltage after maintaining a normal amount of assist torque for a predetermined reference time, and configured to, if the voltage falls within a predetermined assist estimation area, estimate the amount of available assist; and an output controller configured to perform control such that output indication information including the amount of available assist is output through an external output device.

Another embodiment provides a method for EPS control, which may include: determining whether or not a power source problem has occurred using a voltage of a power input to a motor; if it is determined that a power source problem has occurred, determining the amount of assist torque using the voltage after maintaining a normal amount of assist torque for a predetermined reference time, and if the voltage falls within a predetermined assist estimation area, estimating the amount of available assist; and performing control such that output indication information including the amount of available assist is output through an external output device.

The present disclosure gives an effect in which a driver can take various actions according to driver's determination without immediately moving the vehicle to a safety zone.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the following description, the same components will be designated by the same reference numerals although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

A power used for driving the EPS is normally supplied by an alternator. The alternator is connected to a crankshaft of an engine, thereby continuously charging the battery when the vehicle is running.

If the alternator is faulty, the EPS uses, as a power source, only the power that has been stored in the battery. Even if the alternator is not faulty, if there is problem with the connection from the alternator to the EPS, the EPS uses the battery power as the power source.

In this case, the battery is rapidly discharged while the vehicle is running, and when the battery is discharged, power cannot be supplied to the EPS any more so that the operation thereof is stopped. The driver then enters into a state in which he/she cannot control the vehicle.

Therefore, the driver must promptly move the vehicle to a safety zone if he/she recognizes that malfunction has occurred in the power supply. At this time, even if malfunction occurs in the power supply, the battery of the vehicle can guarantee the power supply for a predetermined period of time. This is due to the fact that if the battery is discharged to such an extent that the power supply cannot be guaranteed for a predetermined period of time, the vehicle would not have operated normally in the initial startup stage. Therefore, if the driver moves the vehicle to a safety zone within a predetermined period of time, he/she can avoid a dangerous situation in which the vehicle is out of control.

Accordingly, the present disclosure provides an apparatus and a method for EPS control, which support, when malfunction occurs in the power source, the driver to recognize the malfunction and to take relevant actions in response thereto.

Hereinafter, the present disclosure will be described in detail with reference to the drawings.

Figure 1:
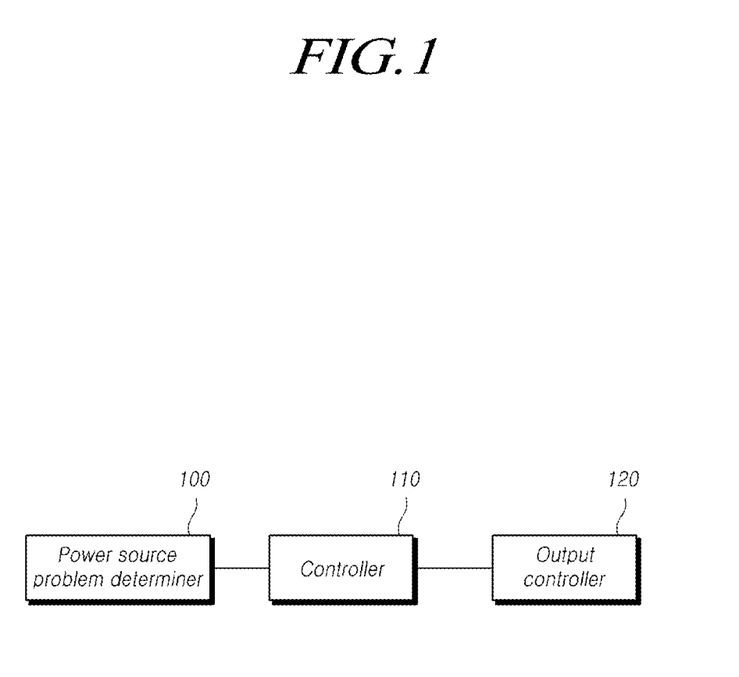
FIG. 1 is a schematic block diagram illustrating only components relevant to the present disclosure.

FIG. 1 is a schematic block diagram illustrating only components relevant to the present disclosure.

Referring to FIG. 1, an apparatus for EPS control may include a power source problem determiner 100, a controller 110, and an output controller 120.

The power source problem determiner 100 determines whether or not a power source problem occurs using a voltage of power input to a motor. The voltage of the power input to the motor may be identified by a separate sensor or detector, and may be updated in a predetermined period or pattern. Hereinafter, the voltage mentioned in the description of the disclosure denotes the voltage of the power input to the motor.

For example, the power source problem determiner 100 may determine that a power source problem has occurred if the above-mentioned voltage is equal to or less than a predetermined specific reference value. When it is determined that a power source problem has occurred, the power source problem determiner 100 may give notification of the occurrence of the power source problem to the controller 110.

The controller 110 may maintain the normal amount of assist torque for a predetermined reference time after receiving the notification of the occurrence of the power source problem from the power source problem determiner 100. The normal amount of assist torque means the amount of EPS assist torque, which is determined when there is no power source problem. The normal amount of assist torque may be determined according to the vehicle speed or a signal value detected by a steering torque sensor.

The maintenance of the normal amount of assist torque for the reference time without immediately adjusting the amount of assist torque by the controller 110 in the event of a power source problem is intended to avoid situations in which the driver cannot control the vehicle according to his/her intention due to a sudden change in the amount of assist torque in the process of moving the vehicle to a safety zone or emergency parking area after the power source problem is recognized. This is due to the fact that since the operation of the battery is guaranteed for a predetermined reference time even if a power source problem occurs as described above, the vehicle is not likely to have other problems even if the controller 110 maintains the normal amount of assist torque.

If the reference time has elapsed since the occurrence of the power source problem, the controller 110 may use the voltage to determine the amount of assist torque.

Also, if the voltage falls within a predetermined assist estimation area, the controller 110 may estimate the amount of available assist. The amount of available assist is information indicating how long or how much the vehicle can provide assist in the current power state, and is not necessarily the same as the amount of assist torque.

For example, the amount of available assist may be time information indicating how long the vehicle can generate an assist torque after the occurrence of the power source problem. As another example, the amount of available assist may be information indicating the ratio of assist torque that can be generated compared to the normal amount of assist torque in percentage.

The controller 110 may then transmit information on the estimated amount of available assist to the output controller 120.

The output controller 120 may perform control such that output indication information including the amount of available assist received from the controller 110 is output through an external output device. Even in the case of an autonomous vehicle, the driver must recognize the occurrence of a power source problem. Accordingly, it is necessary to output the output indication information through the external output device. Further, since humans may make a decision more efficiently than machines in an emergency situation in which normal operation of the electronic device is not guaranteed, it is necessary to output the output indication information through the external output device.

The output indication information, for example, may be information of a sentence indicating the amount of available assist. As another example, the output indication information may be a voice message in a language for notifying of the amount of available assist or an alert sound of a specific pattern.

The external output device may be a display device installed in the vehicle. Alternatively, the external output device may be a speaker for outputting sound.

Figure 2:
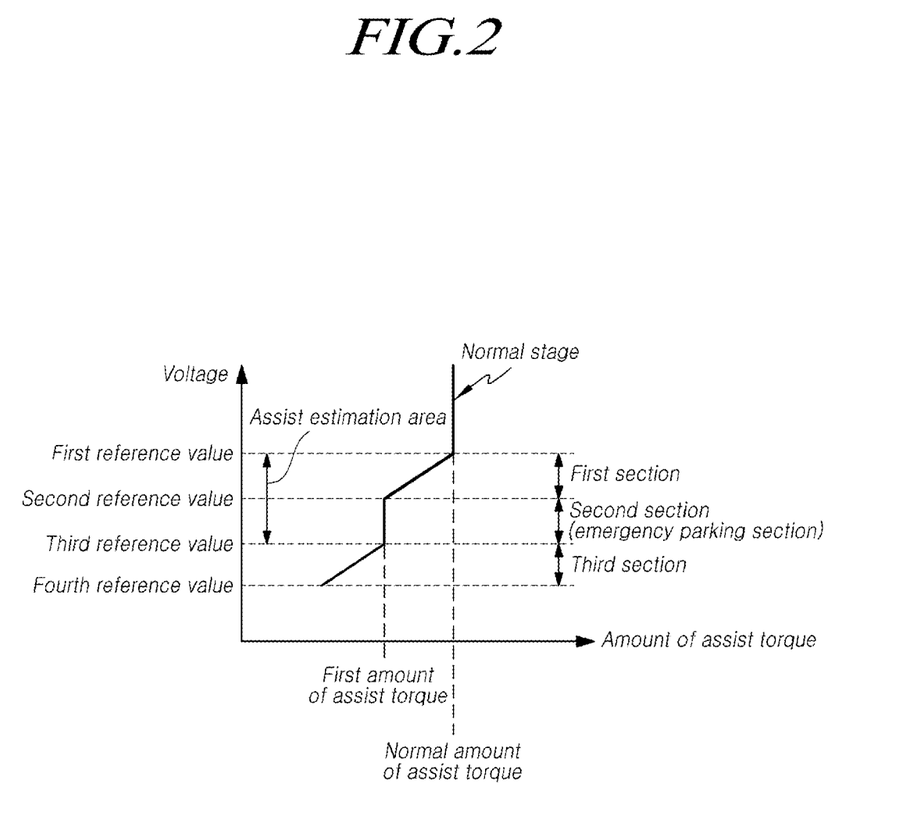
FIG. 2 is a diagram for explaining a process of determining the amount of assist torque depending on a voltage of the power input to a motor and an assist estimation area according to an embodiment of the present disclosure.

FIG. 2 is a diagram for explaining a process of determining the amount of assist torque depending on a voltage of power input to a motor and an assist estimation area according to an embodiment of the present disclosure.

Referring to FIG. 2, the controller 110 may determine the amount of assist torque differently depending on a plurality of predetermined assist torque amount determination sections. A plurality of predetermined assist torque amount determination sections may be provided because it is difficult to determine the amount of assist torque conforming to the situation if the amount of assist torque is determined linearly based on a single criterion depending on the voltage. The amount of assist torque may vary in proportion to the voltage in a specific section, or the amount of assist torque may vary in proportion to an exponential or logarithmic value of the voltage in some sections. In addition, the EPS is required to provide a specific level of the amount of assist torque for vehicle control in another section. Therefore, the relationship between the voltage and the amount of assist torque may be determined by different criteria depending on the sections, and may have a non-linear form as a whole.

For example, if a voltage of the power input to the motor falls within a predetermined first or third section, the controller 110 may determine the amount of assist torque in proportion to the voltage. In this case, the voltage of the third section is equal to or less than the voltage of the first section.

As another example, if a voltage of the power input to the motor falls within the first or third section, the controller 110 may determine the amount of assist torque in proportion to the exponential value or logarithmic value of the voltage.

In addition, if the voltage falls within a predetermined second section, the controller 110 may determine the amount of assist torque to be a fixed first amount of assist torque. In this case, the voltage of the second section is equal to or less than the voltage of the first section and is equal to or greater than the voltage of the third section.

The second section may be an emergency parking section. If the voltage corresponds to the emergency parking section, there is a high possibility in that the power supply to the electronic devices of the vehicle will be stopped soon. Thus, the driver must park the vehicle on the shoulder or safety zone in order to secure safety. At this time, if the EPS maintains the fixed first amount of assist torque, the driver can easily move the vehicle to the emergency parking area.

If the voltage drops below the minimum value of the third section, the amount of assist torque is determined to be zero because the controller 110 can no longer maintain the amount of assist torque.

Meanwhile, the normal amount of assist torque and the first amount of assist torque may be adjusted according to the speed and lateral acceleration of a vehicle equipped with the apparatus for EPS control described in the present disclosure.

For example, if the speed of a vehicle equipped with the apparatus for EPS control described in the present disclosure increases, even if the driver slightly rotates the steering wheel, a change in the actual steering of the vehicle becomes large. Accordingly, if the assist torque equal to that when the vehicle is at a low speed or in a stopped state is provided, the steering of the vehicle may be determined differently from the intention of the driver. Therefore, as the vehicle speed increases, the magnitude of the assist torque provided by the EPS decreases in inverse proportion thereto.

Accordingly, in order to reduce the overall assist torque, the controller 110 may adjust the normal amount of assist torque and the first amount of assist torque described above in inverse proportion to the vehicle speed. When the normal amount of assist torque and the first amount of assist torque are reduced, the amount of assist torque in the first or third section may also be adjusted in inverse proportion to the vehicle speed.

Meanwhile, the driver is required to quickly steer the vehicle in the event of a power source problem when the vehicle equipped with the apparatus of EPS control according to the present disclosure is traveling on a sharp curve, compared to when the vehicle is moving on a straight course. When the driver performs braking while the vehicle is moving in a straight line, the vehicle may easily escape from a dangerous situation. However, when the vehicle is moving on a sharp curve, even if the driver performs braking, the vehicle is likely to deviate from the designated lane. Accordingly, as the magnitude of the lateral acceleration applied to the vehicle increases (that is, when the vehicle moves on a sharp curve), the magnitude of the assist torque increases in proportion thereto, thereby allowing the driver to quickly steer the vehicle.

Therefore, in order to increase the overall assist torque, the controller 110 may adjust the normal amount of assist torque and the first amount of assist torque in proportion to the lateral acceleration. When the normal amount of assist torque and the first amount of assist torque increase, the amount of assist torque in the first or third section may be adjusted in proportion to the lateral acceleration. However, in the two examples described above, the normal amount of assist torque and the first amount of assist torque do not vary depending on the voltage of the power input to the motor. That is, the normal amount of assist torque and the first amount of assist torque determined by the vehicle speed or the lateral acceleration are fixed even if the voltage of the power input to the motor changes.

The controller 110 may estimate the amount of available assist if the voltage falls within a predetermined assist estimation area. For example, the assist estimation area may be an area obtained by summating the first section and the second section, which ranges from the time at which a power source problem occurs to a minimum value of the emergency parking section. In this case, the method of estimating the amount of available assist is different from the method of determining the amount of assist torque according to the voltage, and the methods are not required to be related to each other or to be the same.

If the voltage is less than the assist estimation area, the controller 110 may set the amount of available assist to a predetermined minimum amount of available assist. The minimum amount of available assist may be expressed as a fixed time or percentage, and may be zero.

For example, the amount of available assist may be determined by Equation 1 below.

$$\text{If ((third reference value)} < \text{(power voltage))} \quad \text{[Equation 1]}$$

$$\text{((power voltage)} - \text{(third reference value))}/$$

-continued

In the above example, the third reference value is the minimum value of the assist estimation area, and the first reference value is the maximum value of the assist estimation area. If the voltage of the power input to the motor exceeds the third reference value, the amount of available assist may be determined in proportion to the voltage. If the voltage of the power input to the motor is equal to or less than the third reference value, the amount of available assist may be determined to be 0%, which is the minimum amount of available assist.

As another example of a method for determining the amount of available assist, the amount of available assist may be determined in proportion to an exponential or logarithmic value of the voltage if the voltage of the power input to the motor falls within the assist estimation area.

As another example of a method for determining the amount of available assist, the amount of available assist may be determined differently depending on a plurality of predetermined available assist amount sections.

If the amount of available assist is set to a minimum amount of available assist, power supply to various devices of the vehicle will be stopped soon. Therefore, it is necessary to provide the driver with separate warning information so that the driver can recognize the same and take urgent actions.

One example of the warning information may be information stating that the amount of available assist is 0%. Another example of providing the warning information may be an alert sound or periodic flashing of red light.

Figure 3:
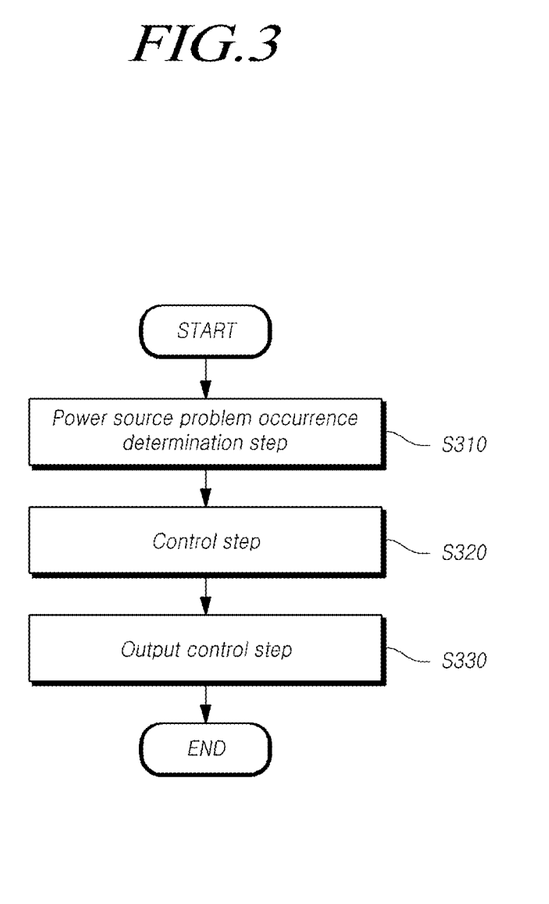
FIG. 3 is a flowchart of an EPS vehicle control method according to an embodiment of the present disclosure.

FIG. 3 is a flowchart of a vehicle control method according to an embodiment of the present disclosure.

Hereinafter, a description will be made of an example in which the above method is performed according to the contents shown in FIG. 2.

Referring to FIG. 3, an EPS vehicle control method may include a power source problem occurrence determination step of determining whether or not a power source problem has occurred based on voltage information on the power input to the motor (S310). For example, if the voltage of the power input to the motor is equal to or less than a predetermined reference value in the above determination step, it may be determined that a power source problem has occurred.

If it is determined that a power source problem has occurred, the EPS vehicle control method may include a control step of maintaining the normal amount of assist torque for a predetermined reference time, determining the amount of assist torque using the voltage, and if the voltage falls within a predetermined assist estimation area, estimating the amount of available assist (S320).

In this case, in the above-described control step, the amount of assist torque may be determined according to a plurality of predetermined assist torque amount determination sections. For example, if the voltage falls within a predetermined first or third section, the amount of assist torque may be determined in proportion to the voltage, wherein the voltage of the third section may be equal to or less than the voltage of the first section. In addition, if the voltage falls within a predetermined second section, the amount of assist torque may be determined to be a fixed first amount of assist torque, wherein the voltage of the second section may be equal to or less than the voltage of the first section and equal to or more than the voltage of the third section.

If the voltage is equal to or less than a predetermined assist estimation area in the control step, the amount of available assist may be set to a predetermined minimum amount of available assist.

In addition, the normal amount of assist torque and the first amount of assist torque may be adjusted by the vehicle speed and the lateral acceleration in the control step. As described in FIG. 2, the normal amount of assist torque and the first amount of assist torque, for example, may be adjusted in inverse proportion to the vehicle speed. As another example, the normal amount of assist torque and the first amount of assist torque may be adjusted in proportion to the lateral acceleration.

The EPS vehicle control method may include an output control step of performing control such that output indication information including the amount of available assist estimated in the control step is output through an external output device (S330). If the amount of available assist is the minimum amount of available assist, separate warning information may be included in the output indication information.

Figure 4:
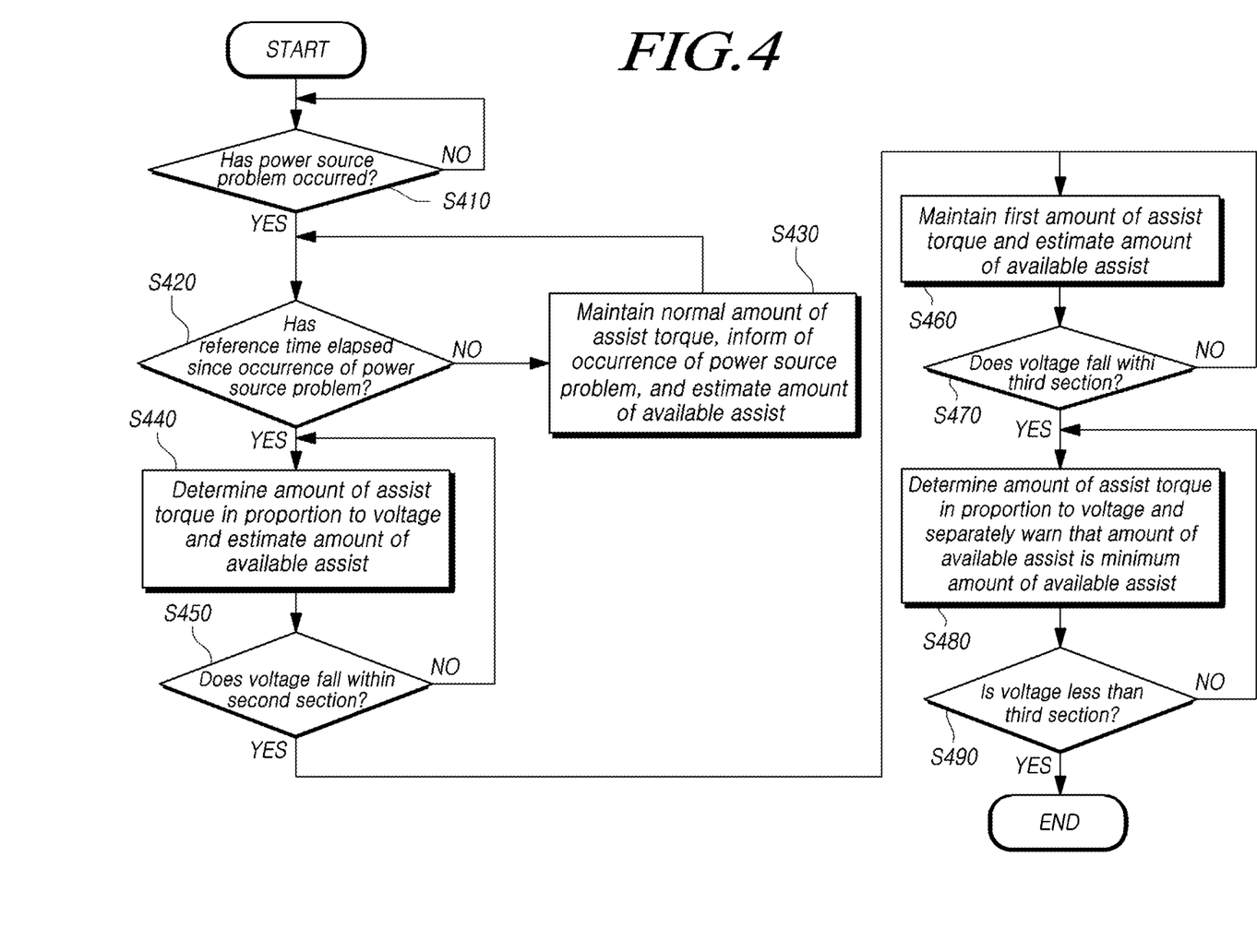
FIG. 4 is a flowchart illustrating a detailed procedure for performing determination of the amount of assist torque and estimation of the amount of available assist when a power source problem occurs according to an embodiment of the present disclosure.

FIG. 4 is a flowchart illustrating a detailed procedure for performing determination of the amount of assist torque and estimation of the amount of available assist when a power source problem occurs according to an embodiment of the present disclosure.

Hereinafter, a description will be made of an example in which the above method is performed according to the contents shown in FIG. 2.

Referring to FIG. 4, the EPS vehicle control method may include a step of determining whether or not a power source problem has occurred based on voltage information on the power input to a motor (S410). For example, if the voltage of the power input to the motor is equal to or less than a predetermined reference value in the determination step, it may be determined that a power source problem has occurred.

If it is determined that a power source problem has occurred, the EPS vehicle control method may include a control step of maintaining the normal amount of assist torque for a predetermined reference time, determining the amount of assist torque using the voltage, and if the voltage falls within a predetermined assist estimation area, estimating the amount of available assist. Hereinafter, the details of the control step will be described.

If it is determined that a power source problem has occurred, the method for EPS control may include a step of determining whether or not a reference time has elapsed since the occurrence of the power source problem (S420). The reference time is a predetermined value, and the battery can ensure the normal power supply for the reference time even if a power source problem occurs.

If the reference time has not yet elapsed, the method for EPS control may include a step of maintaining the normal amount of assist torque, informing the driver of the occurrence of the power source problem, and estimating the amount of available assist (S430). When the driver recognizes the occurrence of the power source problem, he or she can take measures to move the vehicle to a safety zone. In this case, the method for EPS control can allow the normal amount of assist torque to be maintained in order for the driver to normally move the vehicle to a safety zone. If the voltage of the power input to the motor falls within a predetermined assist estimation area, the amount of available assist may be estimated.

If the reference time has elapsed since the occurrence of the power source problem, the voltage of the power input to the motor may be included in the predetermined first section. In addition, the first section may also be included in the predetermined assist estimation area. Thus, the method for EPS control may determine the amount of assist torque in proportion to the voltage, and may estimate the amount of available assist (S440).

Next, the method for EPS control may include a step of determining whether or not the voltage input to the motor falls within the second section (S450). If the voltage input to the motor drops from the first section to the second section due to the continuation of the power source problem, the vehicle must immediately move to a safety zone for emergency parking. The second section is also included in the predetermined assist estimation area. Therefore, the method for EPS control may include a step of maintaining a fixed first amount of assist torque so that the driver can move the vehicle to a safety zone and estimating the amount of available assist (S460).

Subsequently, the method for EPS control may include a step of determining whether or not the voltage input to the motor falls within the third section (S470). If the voltage input to the motor drops from the second section to the third section due to the continuation of the power source problem, the power supply to the EPS will be shut off soon. Therefore, the assistant torque must continue to be provided in order for the driver to perform steering according to his or her intention. Although the third section is not included in the predetermined assist estimation area, since the vehicle is currently in the situation in which the vehicle will be out of control soon, the driver is required to recognize the risk of the current vehicle situation. Thus, the method for EPS control may include a step of determining the amount of assist torque in proportion to the voltage and separately alerting the driver to the information indicating that the amount of available assist is a predetermined minimum amount of available assist (S480).

In addition, the method for EPS control may include a step of determining whether or not the voltage input to the motor is less than the third section (S490). If the voltage input to the motor drops below the third section due to the continuation of the power source problem, the EPS can no longer generate assist torque. In this case, the method for EPS control is terminated.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

Although the embodiments of the present disclosure have been described for illustrative purposes, those skilled in the art will appreciate that various modifications, additions and substitutions are possible, without departing from the scope and spirit of the disclosure. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. An apparatus for Electric Power Steering (EPS) control, comprising:
   a power source problem determiner configured to determine whether or not a power source problem has occurred using a voltage of power input to a motor;
   a controller configured to:
   if it is determined that the power source problem has occurred, maintain a normal amount of assist torque, which is the same as an amount of assist torque provided when the power source problem does not occur, for a predetermined reference time without immediately adjusting an amount of the assist torque, and after the predetermined reference time, determine the amount of the assist torque based on the voltage of the power input to the motor and adjust the amount of the assist torque according to the determined amount of the assist torque, and
   if the voltage of the power input to the motor falls within a predetermined assist estimation area, estimate an available amount of assist which is available by the power input to the motor; and
   an output controller configured to perform control such that output indication information comprising the estimated available amount of assist, available by the power input to the motor, is output through an external output device to inform the estimated available amount of assist, available by the power input to the motor, to a driver,
   wherein a plurality of voltage ranges of the power input to the motor correspond to a plurality of predetermined assist torque amount determination sections, respectively, each of the plurality of predetermined assist torque amount determination sections corresponds to a respective different amount of assist torque among a plurality of amounts of assist torques, and the controller is configured to adjust the amount of assist torque according to one of the plurality of amounts of the assist torques corresponding to one of the plurality of predetermined assist torque amount determination sections corresponding to the voltage of power input to the motor,
   wherein the controller is configured to adjust the amount of assist torque in proportion to the voltage of the power input to the motor if the voltage of the power input to the motor falls within a predetermined first or third section, and wherein the voltage of the third section is equal to or less than the voltage of the first section, and
   wherein the controller is configured to adjust the amount of assist torque to a fixed amount of assist torque if the voltage of the power input to the motor falls within a predetermined second section, and wherein the voltage of the second section is equal to or less than the voltage of the first section and is equal to or more than the voltage of the third section.

2. The apparatus of claim 1, wherein the controller is configured to adjust the normal amount of assist torque and the fixed amount of assist torque in inverse proportion to the vehicle speed.

3. The apparatus of claim 1, wherein the controller is configured to adjust the normal amount of assist torque and the fixed amount of assist torque in proportion to the lateral acceleration.

4. The apparatus of claim 1, wherein the controller is configured to set the available amount of assist, available by the power input to the motor, to a predetermined minimum amount of available assist if the voltage of the power input to the motor is less than the predetermined assist estimation area.

5. The apparatus of claim 4, wherein the output controller is configured to add warning information to the output indication information if the available amount of assist, available the power input to the motor, is the predetermined minimum amount of available assist.

6. A method for EPS control, the method comprising:
determining whether or not a power source problem has occurred using a voltage of power input to a motor;
if it is determined that a power source problem has occurred, maintaining a normal amount of assist torque, which is the same as an amount of assist torque provided when the power source problem does not occur, for a predetermined reference time without immediately adjusting an amount of the assist torque, and after the predetermined reference time, determining the amount of the assist torque based on the voltage of the power input to the motor and adjusting the amount of the assist torque according to the determined amount of the assist torque;
if the voltage of the power input to the motor falls within a predetermined assist estimation area, estimating an available amount of assist, available by the power input to the motor; and
performing control such that output indication information comprising the estimated available amount of assist, available by the power input to the motor, is output through an external output device to inform the estimated available amount of assist, available by the power input to the motor, to a driver,
wherein a plurality of voltage ranges of the power input to the motor correspond to a plurality of predetermined assist torque amount determination sections, respectively, each of the plurality of predetermined assist torque amount determination sections corresponds to a respective different amount of assist torque among a plurality of amounts of assist torques, and the performing control comprises adjusting the amount of assist torque according to one of the plurality of amounts of the assist torques corresponding to one of the plurality of predetermined assist torque amount determination sections corresponding to the voltage of power input to the motor,
wherein the performing control comprises adjusting the amount of assist torque in proportion to the voltage of the power input to the motor if the voltage of the power input to the motor falls within a predetermined first or third section, and wherein the voltage of the third section is equal to or less than the voltage of the first section, and
wherein the performing control comprises adjusting the amount of assist torque to a fixed amount of assist torque if the voltage of the power input to the motor falls within a predetermined second section, and wherein the voltage of the second section is equal to or less than the voltage of the first section and is equal to or more than the voltage of the third section.

7. The method of claim 6, wherein the performing control comprises setting the available amount of assist, available by the power input to the motor, to a predetermined minimum amount of available assist if the voltage of the power input to the motor is equal to or less than the predetermined assist estimation area.

8. The method of claim 7, wherein the outputting comprises adding separate warning information to the output indication information if the amount of available assist, available by the power input to the motor, is the minimum amount of available assist.

* * * * *